United States Patent
Johnson, Jr.

(10) Patent No.: US 6,237,977 B1
(45) Date of Patent: May 29, 2001

(54) OVER-CENTER PELICAN HOOK

(75) Inventor: Curtiss S. Johnson, Jr., Groton Long Point, CT (US)

(73) Assignee: C. Sherman Johnson Co., East Haddam, CT (US)

( * ) Notice: Subject to any disclaimer, the term of this patent is extended or adjusted under 35 U.S.C. 154(b) by 0 days.

(21) Appl. No.: 09/340,354

(22) Filed: Jun. 28, 1999

(51) Int. Cl.⁷ .................. B66C 1/36; F16B 45/04
(52) U.S. Cl. .................. 294/82.34; 294/82.21; 24/600.2
(58) Field of Search .............. 294/82.21, 82.23, 294/82.24, 82.31, 82.33, 82.34, 82.27; 24/68 CT, 599.9, 600.2

(56) References Cited

U.S. PATENT DOCUMENTS

| | | | |
|---|---|---|---|
| 23,985 | * 5/1859 | Mealey | 294/82.34 |
| 343,037 | * 6/1886 | Klinkner | 294/82.21 |
| 1,278,494 | * 9/1918 | Nesbit | 294/82.21 |
| 1,636,209 | * 7/1927 | Bergsten | 24/600.2 |
| 2,091,477 | * 8/1937 | Grau | 24/600.2 |
| 4,093,293 | * 6/1978 | Huggett | 294/82.33 |
| 4,401,333 | * 8/1983 | Merry | 294/82.34 |
| 4,632,443 | * 12/1986 | Miller et al. | 294/82.34 |
| 5,634,246 | * 6/1997 | Jermyn, Jr. | 294/82.34 |

* cited by examiner

Primary Examiner—Dean J. Kramer
(74) Attorney, Agent, or Firm—McCormick, Paulding & Huber LLP

(57) ABSTRACT

An over-center pelican hook includes a hook body having an attachment end which fixably attaches the pelican hook to a threaded cable and a hooked end configured for selectively retaining and releasing an anchoring member in the pelican hook. The hook-shaped second end carries a tensile load when the pelican hook is connected between the cable and the anchoring member. A hinged keeper is pivotally mounted to the second end and moves from a closed position in which the anchoring member is retained within a closed eye formed by the hook body and the hinged keeper, to an open position which opens the eye and allows the anchoring member to be released from the pelican hook. The hinged keeper has an extractor claw which engages the anchoring member as the hinged keeper is moved from the closed position to the open position to facilitate the release of the anchoring member from the pelican hook.

8 Claims, 3 Drawing Sheets

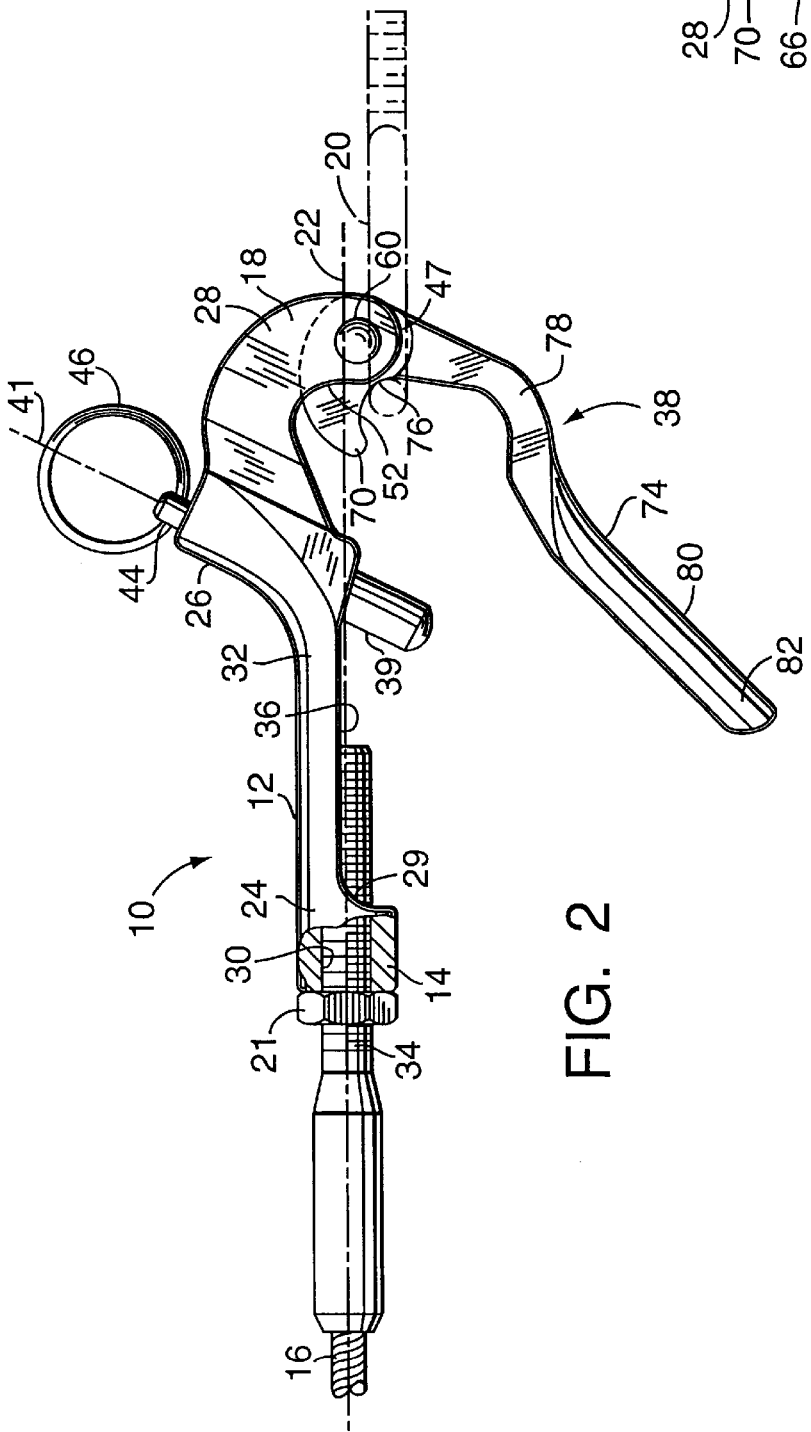
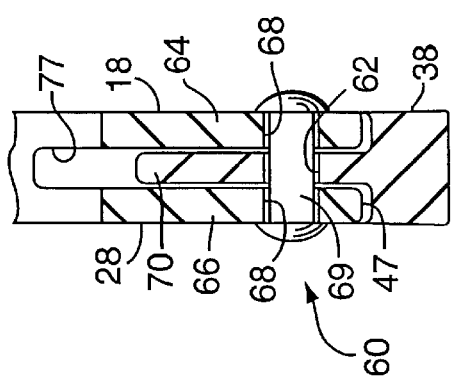
FIG. 2
FIG. 3

OVER-CENTER PELICAN HOOK

BACKGROUND OF THE INVENTION

1. Technical Field

The present invention relates to pelican hooks and, more particularly, to an over-center pelican hook which connects a cable to an anchoring member and has a hinged keeper that is not loaded when the pelican hook is closed and engaged in tension with the anchoring member. The hinged keeper also has an extractor claw to assist in releasing the pelican hook from engagement with the anchoring member.

2. Background Art

Conventional pelican hooks for use on fencing or railing are well known in the art, particularly in marine applications. Pelican hooks are used on boat railings to allow a section of the railing to be opened and closed for the ingress and egress of passengers or cargo. Primarily, the railings in boat applications are for safety and prevent passengers from falling overboard when the railing is closed. Similar applications of pelican hooks may be found in railings for temporary staircases, bleachers, or pedestrian aisle guide rails, where arrangements of the chains, cables or ropes are often changed. Marine applications demand that the hook function properly and retain its strength in harsh marine environments that easily corrode metallic components.

In general, a pelican hook is used by first fixing the hook to the moveable portion of the gate, fence, railing or, typically, a cable. An eye in the hook allows the hook to be engaged with an anchoring member such as an eyelet on a rigid fence post or an adjacent railing cable. The pelican hook is equipped with a hinged keeper that partially defines the enclosed eye in which the eyelet of the anchoring member is retained, and which allows the hook to be disconnected from the eyelet.

There are, however, drawbacks associated with pelican hooks currently in use. A commonly-used pelican hook is found in U.S. Pat. No. 3,938,844 to Johnson. This hook has a hinged keeper that is placed under tension by an anchoring member bearing against the hinged keeper during normal use of the pelican hook. The tensile load would cause the hinged keeper to open but for the resistance of a retaining device that keeps the hinged keeper closed. The hinged keeper is opened by simultaneously relieving the tension transferred from the keeper to the retaining device and releasing the retaining device from the keeper.

In high-tension applications, disconnecting the pelican hook from the anchoring member requires strength and dexterity to release the retaining device, and may be difficult and even dangerous. Additionally, the operational life of the hook may be shortened by deterioration of the hook components due to high tensile and shear forces between the components. Frictional wear may be accelerated when the hook is used in a salty and sandy marine environment.

It is an object of the present invention to provide a pelican hook that does not have a tendency to move toward an open position when the pelican hook is connected in tension to an anchoring member.

It is a further object of the present invention to provide a hook that provides a safe, conventional method of releasing the hook from the anchoring member.

Yet another object of the present invention is to reduce the load on the retaining device, for example a plunger pin, thereby reducing wear and increasing the useful lifetime of the pelican hook.

SUMMARY OF THE INVENTION

According to an aspect of the present invention, an over-center pelican hook for selectively engaging and releasing a first object from a second object includes a hook body having an attachment means disposed at a first end for fixably attaching said hook body to said first object. A hook-shaped body portion is disposed at an opposite second end of the hook body for engaging the second object and carrying a tensile load between the first and second objects. A hinged keeper has a first end and a second, free end, and is pivotally coupled at the first end to the hook-shaped body portion of the hook body. The free end of the hinged keeper is moveable between a closed position, which forms a closed eye with the hook-shaped body portion for retaining the second object in the eye, and an open position, where the free end is displaced away from the hook-shaped body portion to open the eye and thereby permit the second object to be released from the pelican hook. A retaining device selectively retains the hinged keeper in the closed position.

One advantage of the present invention is that there is no tendency for the pelican hook to move to the open position when placed under load by the anchoring member.

Another advantage of the present invention is that wear of the retaining device is significantly reduced because the retaining device is not loaded when the pelican hook is engaged with the anchoring member.

Yet another advantage of the present invention is realized by the use of the plunger pin, which retracts into the hook body as the hinged keeper is closed, and automatically locks the hinged keeper once the hinged keeper is in the closed position.

These and other objects, features and advantages of the present invention will become more apparent in the light of the following detailed description of best mode embodiments as illustrated in the accompanying drawings.

BRIEF DESCRIPTION OF THE DRAWINGS

FIG. 2 is a side view of the pelican hook of FIG. 1 with the hinged keeper shown in an open position;

FIG. 3 is an enlarged view of the pelican hook taken along the lines 3–3 of FIG. 1;

DETAILED DESCRIPTION OF THE PREFERRED EMBODIMENTS

Figure 1:
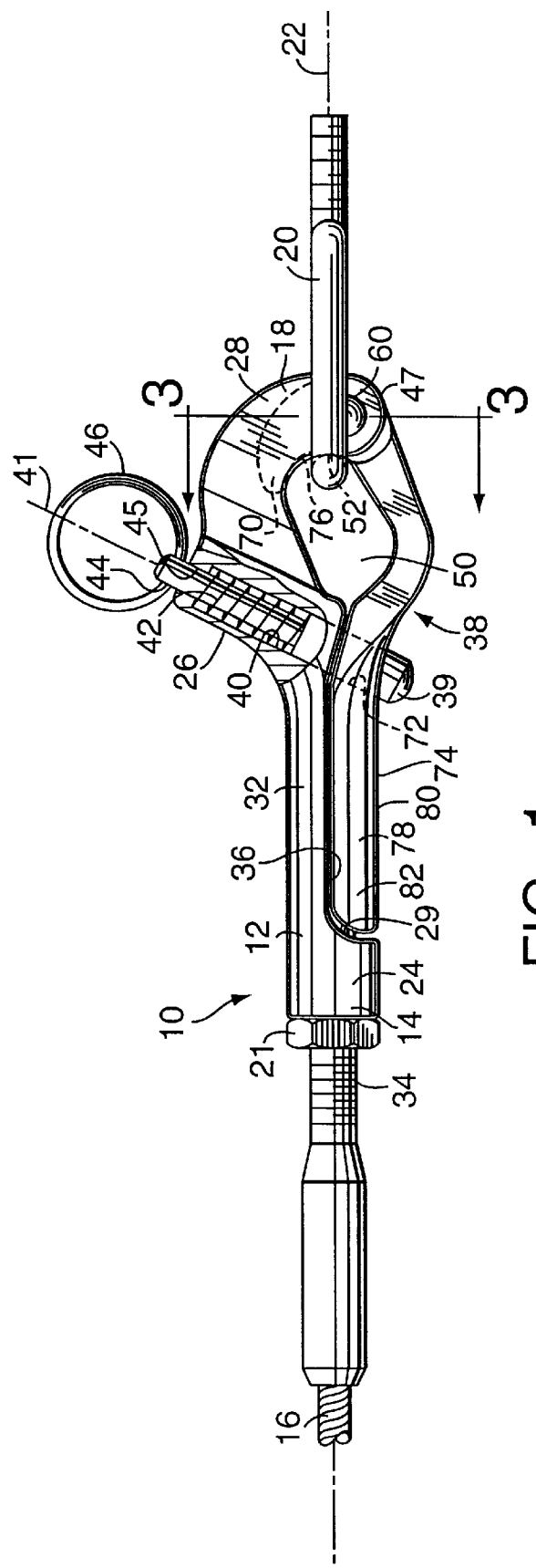
FIG. 1 is a side view of an over-center pelican hook embodying the present invention fastened between a cable and an anchoring member and shown with a hinged keeper in a closed position.

With reference to FIGS. 1 and 2, an over-center pelican hook embodying the present invention is generally designated the reference numeral 10. The pelican hook 10 includes a hook body 12 connected at a first end 14 to a first object in the form of a wire cable 16 and connected at a second end 18 to a second object in the form of an anchoring member 20. A threaded terminal 19 at one end is staged to the cable 16 and at the opposite end is threadably engaged with the hook body 12 at the end 14 for length and tension adjustment. A lock nut 21 holds the adjustment. Between the ends 14 and 18, the hook body 12 is designed so that the cable 16 and the anchoring member 20 are axially aligned with each other along a hook axis 22 extending generally through the hook body 12.

The hook body 12, preferably cast from stainless steel, includes a threaded attachment portion 24 for the terminal 19, an elongated section 32, a plunger pin portion 26, and a hook-shaped body portion 28. The cylindrically-shaped attachment portion 24 defines a threaded bore 30 (seen in FIG. 2) for engaging the threads 34 of terminal 19. The attachment portion 24 connects with the elongated section 32 which generally maintains the cylindrical shape of the attachment portion 24 but has a contoured face 36 defining a recess 29 of the hook body 12 which exposes the threaded bore 30. The recess 29 permits a hinged keeper 38 to be received in the recess 29 so as to mate with the contoured face 36 maintaining a cylindrical exterior profile along the pelican hook 10.

The elongated section 32 connects with the plunger pin portion 26 which supports a plunger pin 39. More specifically, the plunger pin portion 26 defines a plunger pin bore 40 having a pin axis 41 intersecting the hook axis 22 at an obtuse angle of, for example, 115 degrees relative to the pin axis 41. A helical spring 42 is disposed within the plunger pin bore 40 to bias the plunger pin 39 to a position extending from the hook body 12 toward the hinged keeper 38. A pull rod 44 is fixably attached to the plunger pin 39 and extends through a pull rod aperture 45 defined by the hook body 12. A pull ring 46 is attached to the pull rod 44 for manually retracting the plunger pin 39 from the hinged keeper 38 as shown in FIG. 1 into the plunger pin bore 40 (as seen in FIG. 5) to release the hinged keeper.

The hook-shaped body portion 28 extends along the hook body 12 from the plunger pin portion 26 to a distal end 47 of the hook body 12. The hook-shaped body portion 28 intersects the hook axis 22 with a load bearing surface 52 oriented substantially perpendicularly to the hook axis 22, for engaging the anchoring member 20. The perpendicularity eliminates any tendency for the anchoring member to be ejected from the hook body 12 when tension is applied to the pelican hook. In other words, when tension is applied to the pelican hook, there is no tendency for the hinged keeper to react by opening. The hinged keeper 38 is pivotally mounted to a pivot point 60 located at the distal end 47 of the hook body 12.

Referring to FIG. 3, the pivot point 60 defines the connection between the hinged keeper 38 and the hooked portion 28 of the hook body 12. The hinged keeper 38 defines a first pivot bore 62. Two flanges 64, 66 depend from hooked portion 28 and define second pivot bores 68, 68 extending through the flanges 64, 66 and which are axially aligned with the first pivot bore of the hinged keeper 38. A pivot pin 69 aligns, and is secured through, the first and second pivot bores 62, 64, and 68.

Figure 4:
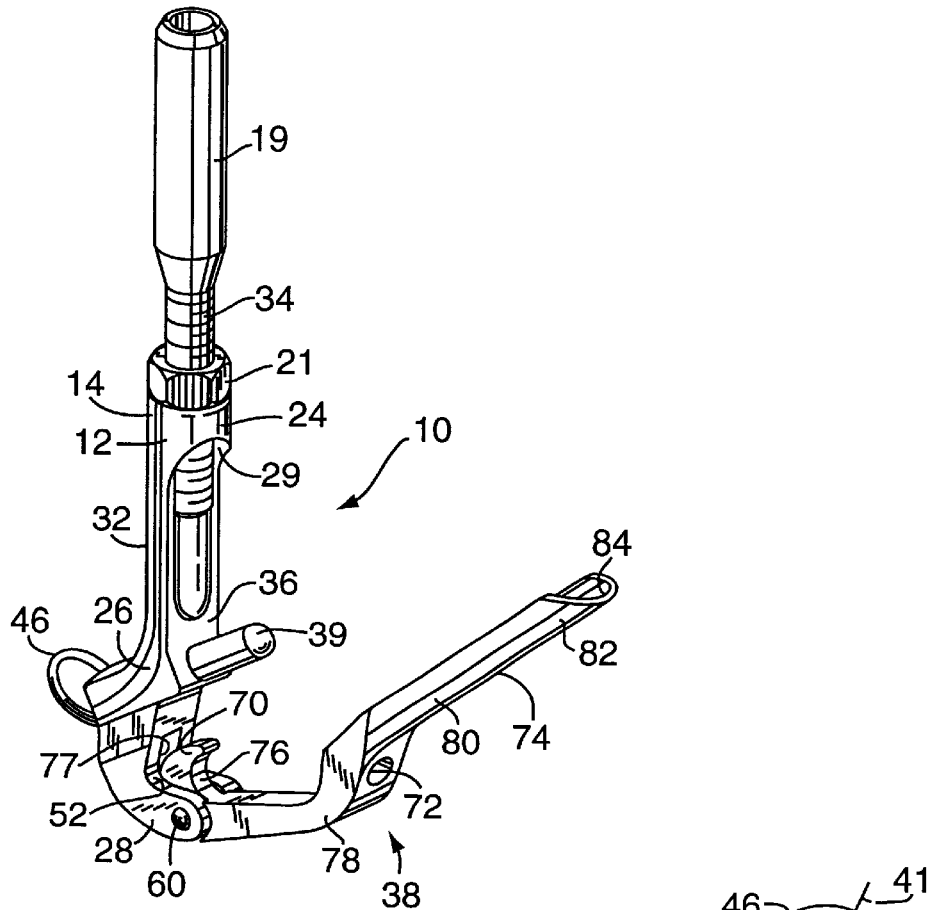
FIG. 4 is a perspective view of the pelican hook of FIG. 1 shown with the hinged keeper in the open position exposing a claw extractor.
Figure 5:
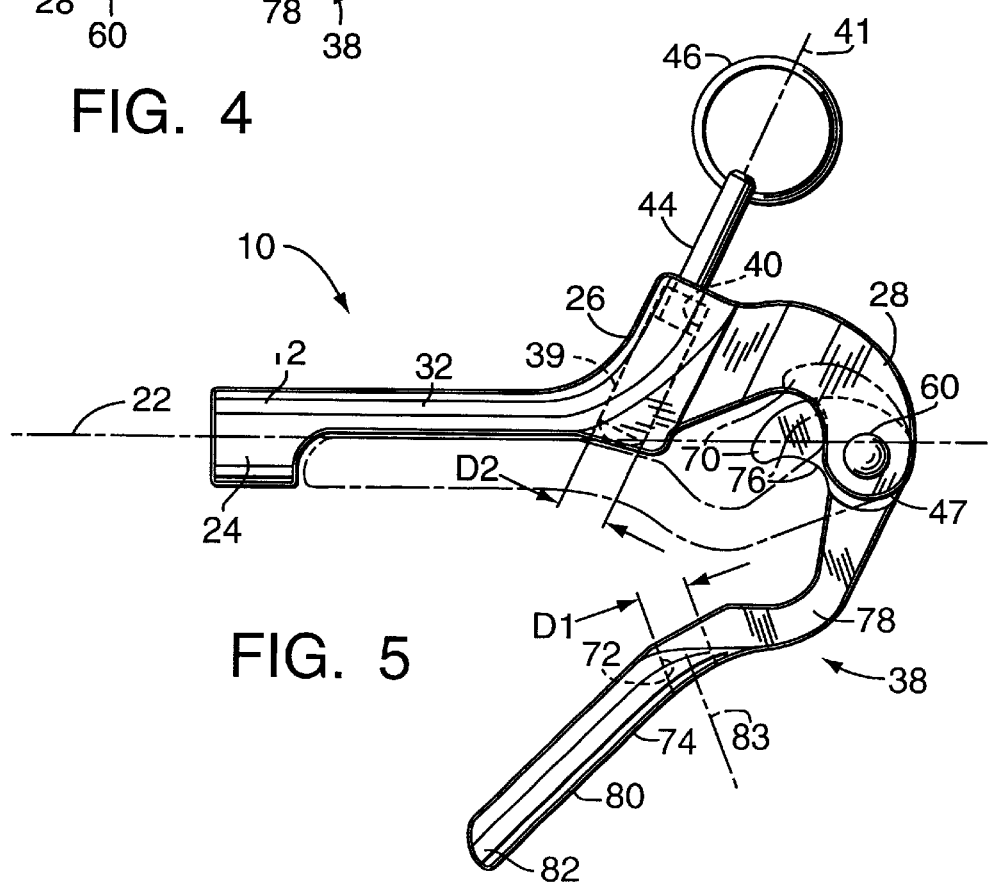
FIG. 5 is a side view showing a portion of the pelican hook of FIG. 1 with a lock pin in a retracted position.

Referring to FIGS. 4 and 5, the hinged keeper 38 includes an extractor claw 70, an elongated handle portion 74, and defines a lock hole 72. The extractor claw 70 and elongated handle portion 74 extend on opposite sides of pivot pin 69. The extractor claw 70 is a J-shaped hook structure having an extractor surface 76. A recess 77 defined by the hooked portion 28 is adapted for receiving and concealing the extractor claw 70. The extractor surface 76 has a radius of curvature slightly larger than that of the load bearing surface 52 so that when the hinged keeper 38 is closed, the extractor surface 76 is concealed within the hooked portion 18, as illustrated in phantom in FIG. 5.

The handle portion 74 defines a curved portion 78, the lock hole 72, and a handle 80 which extend along the hinged keeper 38 from the pivot 60 to a free end 82. The curved portion 78 is configured so that when the hinged keeper 38 is closed, the eye 50 (best seen in FIG. 1) is defined by the hooked portion 28 and curved portion 78 of the hinged keeper 38. The lock hole 72 is defined through the hinged keeper 38 between the curved portion 78 and the handle 80. The lock hole 72 has a lock hole axis 83 which is coaxial with the pin axis 41 when the hinged keeper 38 is closed so as to receive the plunger pin 39. The lock hole 72 has a diameter D1 which is slightly larger than diameter D2 of the plunger pin 39 to allow a snug fit between the plunger pin 39 and the lock hole 72.

The substantially straight handle 80 extends from the lock hole 72 to the free end 82. An inwardly-facing contoured inner surface 84 extends along handle 80 to accommodate the threads 34 of terminal 19 when the handle 80 of hinged keeper 38 is closed against contoured surface 36.

In operation, the pelican hook 10 is fastened between a cable 16 and an anchoring member 20 to form a portion of a railing system, such as those commonly employed on boats. The railing prevents passengers from falling overboard, and the pelican hook permits opening of a section of the railing for the ingress and egress of passengers or cargo.

The terminal 19 is first threaded into the attachment portion 14. An initial estimation is required as to the proper distance to insert the terminal 19 to provide the proper tension and assembled length of the cable 16, pelican hook 10, and the anchoring member 20. Tension in the pelican hook is increased or decreased by altering the distance which the terminal 19 is inserted into the attachment portion 14. The lock nut 21 is moved along the threads 34 toward the attachment portion 14 of the hook body 12 and tightened against the attachment portion 14 to lock the terminal 19 in position relative to the hook body 12.

The pelican hook 10 is connected to the anchoring member 20 by first opening the pelican hook. The pull ring 46 is pulled to retract the plunger pin 39 into the hook body 12 and out of engagement with the lock hole 72 of the hinged keeper 38. When the hinged keeper 38 is disengaged from the plunger pin 39, the hinged keeper 38 is grasped and pivoted about the pivot 60 from the closed position to the open position. Once the hinged keeper 38 is pivoted to the open position, the pull ring 46 can be released and the eyelet of the anchoring member 20 then receives the handle portion 80 of the hinged keeper 38 and the hinged keeper 38 is pivoted toward the closed position. As the hinged keeper 38 is closed, the eyelet of the anchoring member slides into the eye of the pelican hook until the eyelet rests against the load bearing surface 52. When the hinged keeper 38 makes contact with the plunger pin 39, the user closes the hinged keeper 38 with increased force which pushes the plunger pin 39 into the hook body 12 and allows the hinged keeper 38 to be moved to the fully closed position. In the fully closed position, the pin axis 41 aligns with the lock hole axis 83 of the hinged keeper 38, allowing the spring-loaded plunger pin 39 to extend into the lock hole 72, thus locking the hinged keeper 38 in the closed position. In the closed position, the hook body and the hinged keeper define the eye 50 for retaining the anchoring member 20, which bears against the load bearing surface 52 of the hook body 12.

To disconnect the anchoring member 20 from the pelican hook 10, the pull ring 46 is pulled to disengage the plunger pin 39 from the hinged keeper 38. The handle 80 of the hinged keeper 38 is then grasped and pulled from the closed position toward the open position. As the hinged keeper 38 is pivoted toward the open position, the extractor claw 70 also pivots about pivot 60. The extractor surface 76 of the extractor claw 70 engages the anchoring member 20, lifting the anchoring member 20 slightly away from contact with the load bearing surface 52 and into the opening of the eye 50. Once the hinged keeper is opened, the handle portion 80 may be pulled through, and removed from, the eyelet of the anchoring member 20.

One advantage of the present invention is that the hinged keeper is not under load and has no tendency to open when the pelican hook is loaded in tension.

Another advantage of the present invention is that the claw-extractor enables safe, easy removal of the anchoring member from the pelican hook, even when the hook is under load.

While preferred embodiments have been shown and described above, various modifications and substitutions may be made without departing from the spirit and scope of the invention. For instance, different types of mechanisms to lock the hinged keeper closed are considered within the scope of the invention, such as a bolt, clasp, ring, or removable pin. Additionally, the attachment portion can be configured for various types of railing attachments which require a female threaded end or eyelet. The terminal 19 need not be swaged to a cable, but can have other attachment means such as an eyelet or clamp for a cable or other object. Accordingly, it is to be understood that the present invention has been described by way of illustration and not by way of limitation.

What is claimed is:

1. A pelican hook for selectively engaging and releasing a first object from a second object, comprising:

a hook body having an attachment means disposed at a first end for fixably attaching said hook body to said first object, and a hook-shaped body portion at an opposite second end for engaging the second object and carrying a tensile load between the first and second objects; and a hinged keeper having a first end and a second, free end, the hinged keeper being pivotally coupled at the first end to the second end of the hook-shaped body portion of the hook body such that the free end of the hinged keeper is movable between a closed position in which said free end is in contact with said hook body and forms a closed eye with said hook-shaped body portion for retaining said second object in the eye, and an open position where said free end is displaced away from aid hook-shaped body portion to open the eye and thereby permit the second object to be released from the pelican hook;

said hinged keeper further comprising an extracting means for extracting said second object from said eye when said hinged keeper is moved from said closed position to said open position;

said extracting means extending from the hinged keeper at the first pivoted end and is pivoted out of the eye formed by the hook-shaped body portion and the hinged keeper when said hinged keeper is moved to said closed position.

2. The pelican hook of claim 1, wherein the extracting means is a claw received in a recess in the hook-shaped body portion in the closed position of the hinged keeper.

3. The pelican hook of claim 1, further including a releasable retainer coupling the hinged keeper in the closed position with the hook body.

4. The pelican hook of claim 3, wherein the releasable retainer is a plunger pin disposed within said hook body and moveable from an extended position engaging said hinged keeper in the closed position and a retracted position releasing said hinged keeper from the closed position.

5. A pelican hook for selectively engaging and releasing a first object from a second object, comprising:

a hook body having an attachment means disposed at a first end for fixably attaching said hook body to said first object, and a hook-shaped body portion at an opposite second end for engaging the second object and carrying a tensile load between the first and second objects; and a hinged keeper having a first end and a second, free end, the hinged keeper being pivotally coupled at the first end to the hook-shaped body portion of the hook body such that the free end of the hinged keeper is moveable between a closed position in which said free end is in contact with said hook body and forms a closed eye with said hook-shaped body portion for retaining said second object in the eye, and an open position where said free end is displaced away from said hook-shaped body portion to open the eye and thereby permit the second object to be released from the pelican hook;

said hinged keeper further comprising an extracting means for extracting said second object from said eye when said hinged keeper is moved from said closed position to said open position, and for biasing said hinged keeper toward said closed position;

said extracting means extending from the hinged keeper at the first pivoted end and is pivoted out of the eye formed by the hook-shaped body portion and the hinged keeper when said hinged keeper is moved to said closed position.

6. The pelican hook of claim 5, wherein the extracting means is a claw received in a recess in the hook-shaped body portion when the hinged keeper is in the closed position.

7. The pelican hook of claim 5, further including a releasable retainer coupling the hinged keeper in the closed position with the hook body.

8. The pelican hook of claim 7, wherein the releasable retainer is a plunger pin disposed within said hook body and moveable from an extended position engaging said hinged keeper in a closed position and a retracted position releasing said hinged keeper from the closed position.

* * * * *